United States Patent
Byun et al.

(10) Patent No.: US 11,877,222 B2
(45) Date of Patent: Jan. 16, 2024

(54) METHOD AND SYSTEM FOR BROADCASTING DISASTER ALERT

(71) Applicant: UNIVERSITY OF SEOUL INDUSTRY COOPERATION FOUNDATION, Seoul (KR)

(72) Inventors: Yoonkwan Byun, Seoul (KR); Hyunji Lee, Seoul (KR); Sekchin Chang, Seoul (KR); Seong Jong Choi, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 114 days.

(21) Appl. No.: 17/557,239

(22) Filed: Dec. 21, 2021

(65) Prior Publication Data

US 2023/0127418 A1  Apr. 27, 2023

(30) Foreign Application Priority Data

Oct. 26, 2021  (KR) .......................... 10-2021-0143738

(51) Int. Cl.
  *H04W 4/90*  (2018.01)
(52) U.S. Cl.
  CPC .................................... *H04W 4/90* (2018.02)
(58) Field of Classification Search
  CPC .............................................. H04W 4/90
  USPC ................................................... 455/404.1
  See application file for complete search history.

(56) References Cited

U.S. PATENT DOCUMENTS

| | | |
|---|---|---|
| 8,611,872 B2 | 12/2013 | Sennett et al. |
| 11,032,015 B2 | 6/2021 | Oh et al. |
| 2015/0195696 A1* | 7/2015 | Shukla ..................... H04W 4/90 |
| | | 455/404.1 |
| 2019/0174414 A1* | 6/2019 | Liu ....................... H04W 88/022 |
| 2019/0253165 A1 | 8/2019 | Daly et al. |

(Continued)

FOREIGN PATENT DOCUMENTS

| | | |
|---|---|---|
| KR | 10-2020-0124139 | 11/2020 |
| KR | 10-2020-0125030 | 11/2020 |

(Continued)

OTHER PUBLICATIONS

Seong Jong Choi et al., "An Emergency Alert Broadcast Based on the Convergence of 5G and ATSC 3.0", Electronics 2021, 10, 758, Mar. 23, 2021.

(Continued)

*Primary Examiner* — Maria El-Zoobi
(74) *Attorney, Agent, or Firm* — LEX IP MEISTER, PLLC

(57) ABSTRACT

Provided are a method and a system for broadcasting a disaster alert. The method of broadcasting a disaster alert includes: receiving an Advanced Emergency Alert Table (AEAT) message and an Advance Emergency Alert (AEA) message generated to include an NRT component corresponding to a multimedia file from an AEA message application according to an AEA protocol; receiving trigger information extracted from a Cell Broadcast Service (CBS) message from a Non-3GPP InterWorking Function (N3IWF); and transmitting the AEA message to a mobile terminal through an Advanced Television Systems Committee (ATSC) 3.0 broadcast station according to the trigger information.

10 Claims, 7 Drawing Sheets

(56) References Cited

U.S. PATENT DOCUMENTS

2020/0275251 A1* 8/2020 Daly .................... H04M 15/83
2020/0344587 A1* 10/2020 Cho ....................... H04W 4/90

FOREIGN PATENT DOCUMENTS

KR    10-2020-0143797     12/2020
KR    10-2021-0052577      5/2021

OTHER PUBLICATIONS

ATSC Standard: Signaling, Delivery, Synchronization, and Error Protection, ATSC A/331:2021, Jan. 19, 2021.
3rd Generation Partnership Project; Technical Specification Group Core Network and Terminals; Technical realization of Cell Broadcast Service (CBS) (Release 17), 3GPP TS 23.041 V17.0.0 (Sep. 2020).

\* cited by examiner

000# METHOD AND SYSTEM FOR BROADCASTING DISASTER ALERT

CROSS-REFERENCE TO RELATED APPLICATION

This application claims priority to and the benefit of Korean Patent Application No. 10-2021-0143738 filed in the Korean Intellectual Property Office on Oct. 26, 2021, the entire contents of which are incorporated herein by reference.

BACKGROUND OF THE DISCLOSURE

(a) Field of the Disclosure

The present disclosure relates to a method and a system for broadcasting a disaster alert.

(b) Description of the Related Art

Cellular networks and broadcast networks may be used for rapid and reliable disaster alert transmission. The cellular network may use a Cell Broadcast Service (CBS) for transmitting disaster alert. The CBS is suitable for location-based disaster alert services because the cellular network is capable of effectively selecting a base station in which a cell contains a disaster area Further, the CBS is usable even in the case where a mobile terminal of a user is in an idle state. The CBS protocol is standardized for 2G/3G/4G/5G cellular networks. However, since the CBS protocol supports only text-based messages that can contain the limited number of texts, there is limitation in that it is impossible to transmit detailed information, such as detailed evacuation instructions, and only limited information may be transmitted.

In the meantime, the broadcast network may also provide disaster alert services. For example, Advanced Television Systems Committee (ATSC) 3.0 has published several standards for Ultra High Definition (UHD) TV service and IP-based transmission, and the ATSC 3.0 also specifies a standard for the broadcast of disaster alerts called Advanced Emergency Alert (AEA) among them. An AEA message may contain multimedia information together with text data, so that ATSC 3.0 may transmit rich information together with detailed instructions applicable in various disaster situations.

However, ATSC 3.0 uses a wake-up function and location information to transmit a disaster alert to an idle-state receiver in a disaster area, and there is a problem in that it is difficult to directly apply such a wake-up function and location information to a mobile terminal, such as a mobile phone. Accordingly, in order to improve the disaster alert broadcast service in a mobile environment, there is a demand for a method for effectively utilizing the advantages of both networks by converging the 5G network and the ATSC 3.0 network.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method and a system for broadcasting a disaster alert, which are capable of transmitting a disaster alert to a mobile terminal of a user in both directions based on convergence of a 5G-based Cell Broadcast Service (CBS) and an Advanced Television Systems Committee (ATSC) 3.0-based network.

An example embodiment of the present disclosure provides a method of broadcasting a disaster alert, the method including: receiving an Advanced Emergency Alert Table (AEAT) message and an Advance Emergency Alert (AEA) message generated to include an NRT component corresponding to a multimedia file from an AEA message application according to an AEA protocol; receiving trigger information extracted from a Cell Broadcast Service (CBS) message from a Non-3GPP InterWorking Function (N3IWF); and transmitting the AEA message to a mobile terminal through an Advanced Television Systems Committee (ATSC) 3.0 broadcast station according to the trigger information.

In the example embodiment of the present disclosure, the AEA message and the CBS message may be generated based on the same disaster alert issued from an alerting authority, and the AEA message may be transmitted to the mobile terminal by the AEA protocol, and the CBS message may be transmitted to the mobile terminal by a CBS protocol.

In the example embodiment of the present disclosure, the AEA message may further include a CBS-related header, and the method may further include determining whether the trigger information received from the N3IWF matches the CBS-related header by using a multiplexer; when it is determined that the trigger information received from the N3IWF matches the CBS-related header, multiplexing the AEAT message and the NRT component to the AEA message; and when it is determined that the trigger information received from the N3IWF does not match the CBS-related header, temporarily stopping until the trigger information received from the N3IWF matches the CBS-related header.

In the example embodiment of the present disclosure, the CBS-related header may include a first element indicating whether the AEAT message is associated with the CBS message, and a second element indicating an identifier of the associated CBS message.

In the example embodiment of the present disclosure, the method may further include converting the AEA message into a frame unit for a physical layer and transmitting the converted frame to a modulator by using a gateway.

In the example embodiment of the present disclosure, the method may further include converting the frame into a waveform signal by using the modulator, in which the transmitting of the AEA message to the mobile terminal may include transmitting the AEA message to the mobile terminal as the waveform signal through the ATSC 3.0 broadcast station.

Another example embodiment of the present disclosure provides a system for broadcasting a disaster alert, the system including: an Advance Emergency Alert (AEA) message application configured to generate an Advanced Emergency Alert Table (AEAT) message and an AEA message generated to include an NRT component corresponding to a multimedia file according to an AEA protocol; a Non-3GPP InterWorking Function (N3IWF) configured to extract trigger information from a Cell Broadcast Service (CBS) message received from an Access and Mobility Management Function (AMF); and an Advanced Television Systems Committee (ATSC) 3.0 core network configured to receive the AEA message from the AEA message application and transmit the AEA message to a mobile terminal through an ATSC 3.0 broadcast station according to the trigger information.

In the example embodiment of the present disclosure, the AEA message and the CBS message may be generated based on the same disaster alert issued from an alerting authority, and the AEA message may be transmitted to the mobile terminal by the AEA protocol, and the CBS message may be transmitted to the mobile terminal by a CBS protocol.

In the example embodiment of the present disclosure, the AEA message may further include a CBS-related header, and the ATSC 3.0 core network may determine whether the trigger information received from the N3IWF matches the CBS-related header by using a multiplexer; and when it is determined that the trigger information received from the N3IWF matches the CBS-related header, the ATSC 3.0 core network may multiplex the AEAT message and the NRT component to the AEA message, and when it is determined that the trigger information received from the N3IWF does not match the CBS-related header, the ATSC 3.0 core network may temporarily stop until the trigger information received from the N3IWF matches the CBS-related header.

In the example embodiment of the present disclosure, the CBS-related header may include a first element indicating whether the AEAT message is associated with the CBS message, and a second element indicating an identifier of the associated CBS message.

In the example embodiment of the present disclosure, the ATSC 3.0 core network may convert the AEA message into a frame unit for a physical layer and transmit the converted frame to a modulator by using a gateway.

In the example embodiment of the present disclosure, the ATSC 3.0 core network may convert the frame into a waveform signal by using the modulator, and transmit the AEA message to the mobile terminal as the waveform signal through the ATSC 3.0 broadcast station.

According to the foregoing example embodiments of the present disclosure, the N3IWF is used for providing the convergence architecture of the 5G-based CBS and the ATSC 3.0 based network, so that it is possible to implement the interwork of the ATSC 3.0 network corresponding to the non-3GPP network and the 5G core network. Further, by providing the modified AEA table that allows the AEA message to be linked with the CBS message, it is possible to transmit the CBS message and the AEA message in the convergence network at the same time. Therefore, a user is capable of receiving the CBS message and the AEA message from the 5G network and the ATSC 3.0 network through his/her mobile terminal, thereby effectively reducing the transmission delay.

DETAILED DESCRIPTION OF THE EMBODIMENTS

Figure 1:
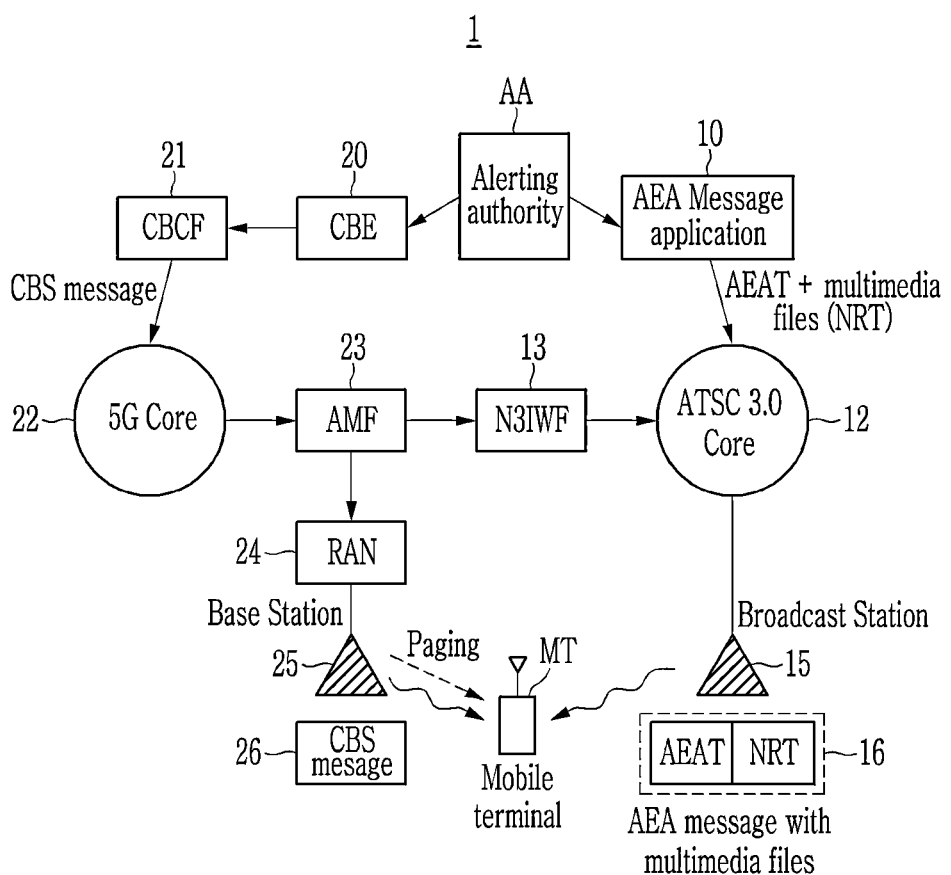
FIG. 1 is a diagram for describing a bi-directional disaster alert broadcasting system using a 5G and Advanced Television Systems Committee (ATSC) 3.0 converging network according to an example embodiment of the present disclosure.

Hereinafter, an example embodiment disclosed in the present specification will be described in detail with reference to the accompanying drawings, and the same or similar constituent element is denoted by the same reference numeral regardless of a reference numeral, and a repeated description thereof will be omitted. Further, in describing the example embodiment disclosed in the present disclosure, when it is determined that detailed description relating to well-known functions or configurations may make the subject matter of the example embodiment disclosed in the present disclosure unnecessarily ambiguous, the detailed description will be omitted. Further, the accompanying drawings are provided for helping to easily understand example embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

FIG. 1 is a diagram for describing a bi-directional disaster alert broadcasting system using a 5G and Advanced Television Systems Committee (ATSC) 3.0 converging network according to an example embodiment of the present disclosure.

Referring to FIG. 1, a disaster alert broadcasting system 1 according to an example embodiment of the present disclosure may provide a disaster alert issued by an alerting authority (AA) to a mobile terminal MT of a user in the form of a CBS message 26 and an AEA message 16 by bidirectionally using a 5G core network 22 and an ATSC 3.0 core network 12.

On a 5G network path, a Cell Broadcast Entity (CBE) 20, a Cell Broadcast Center Function (CBCF) 21, a 5G core network 22, an Access and Mobility Function (AMF) 23, a Radio Access Network (RAN) 25, and a base station 25 may be included. The 5G network may broadcast a disaster alert by using network entities thereof. In the meantime, although the CBCF 21 and the AMF 23 are highlighted as separate elements in FIG. 1, the CBCF 21 and the AMF 23 may be network entities belonging to the 5G core network 22.

When a disaster situation occurs, the alerting authority AA may transmit the disaster alert and location information about a disaster area to the CBE 20, and the CBE 20 which serves as a gateway between the alerting authority AA and a network operator may relay a message received from the alerting authority AA to the CBCF 21 managed by the network operator. Next, the CBCF 21 may convert a message format of the disaster alert to a CBS message format specified in the 3GPP standard, and transmit the converted CBS message to the AMF 23.

The AMF 23 is interfaced to multiple RANs 24, and the AMF 23 may select a base station 25 corresponding to the disaster area among the multiple RANs 24 by using the location information and Tracking Area Information (TAI).

Accordingly, the AMF 23 may transmit the CBS message 26 to the selected base station 25.

In the case of the broadcast of the CBS message 26, the CBS message 26 is included in a System Information Block (SIB), and the SIB is capable of transmitting only small information, so that the 5G CBS protocol allows the limited number of text characters, for example, 360 characters, in the CBS message 26.

On the AT 3.0 network path, an AEA message application 10, an ATSC 3.0 core network 12, and an ATSC 3.0 broadcast station 15 may be included.

The ATSC 3. supports UHD TV services for improved audio/video quality, and adopts IP-based protocols for various broadcast and broadband services. Various components are defined in the IP-based protocol stack for the ATSC 3.0, and a Non-Real Time (NRT) component among them may be transmitted on a broadcast network or a broadband network by using ROUTE/UDP/IP or HTTP/TCP/IP. Further, a low-level signaling (LLS) includes an advanced emergency information table (AEAT), a service list table (SLT), a rate region table (RRT, a system time, a common alerting protocol (CAP), a version information table (VIT), and a content protection table (CPT), and the LLS is transmitted in the broadcast network by using the UDP/IP. Further, the AEAT consists of one or more AEA messages in the LLS, so that the LLS/UDP/IP is used as a protocol for transmitting the AEA message.

Among the AEAT elements, AEAText and Media are related to a disaster text message and multimedia information, and AEAT may include relevant information for a live broadcast stream in the LiveMedia element. Accordingly, the ATSC 3.0 is capable of providing disaster information through rich information, such as text, multimedia, and live broadcast streams, so that it can be seen that ATSC 3.0 provides much richer information than 5G.

Further, the ATSC 3.0 may transmit disaster area information by using the AEAT element of Header<Location>, and when a reception user is not present in the disaster area, the reception user may discard the AEA message by using area information. However, to this end, a positioning device, such as a Global Positioning System (GPS), needs to be used, and the precise positioning device is not mounted to a mobile terminal in general. In the meantime, the AEA<wakeup> element is related to a wakeup service of the ATSC 3.0, and the wakeup service is used for activating a receiver in the idle state for the disaster alert service.

In order to implement the convergence architecture of the two networks, the disaster alert broadcasting system 1 may additionally include an N3IWF 13.

The alerting authority AA may transmit a disaster alert in both directions of 5G and ATSC 3.0 systems at the same time. Further, in the convergence architecture, the N3IWF 13 may be used for converging the 5G core network 22 and the ATSC 3.0 core network 12.

In FIG. 1, the AEA message application 10 may generate an AEAT and a multimedia file belonging to the NRT component. For the association with the CBS message, the AEAT according to the example embodiment of the present disclosure has been corrected and designed to additionally include CBS-related elements. For example, the AEAT according to the example embodiment of the present disclosure additionally includes a Header<CBS flag> and a Header<CBS ID>, and the Header<CBS flag> indicates a Boolean value for whether AEAT is associated with the CBS message for broadcasting the disaster alert on the convergence network of FIG. 1, and the Header<CBS ID> includes an identifier of the associated CBS message.

In particular, an operation scenario of the system 1 for broadcasting a disaster alert according to the example embodiment of the present disclosure may be as follows.

1. When a disaster situation occurs, the alerting authority AA may simultaneously transmit a disaster alert message to the CBE 20 and the CBCF 21 of 5G and the AEA message application 10 of the ATSC 3.0.

2. The CBCF 21 may convert the disaster alert message into a CBS message according to the CBS protocol, and transmit the converted CBS message to the AMF 23 of the 5G core network 22. In the meantime, the AEA message application 10 may generate a modified AEAT and a multimedia file (NRT component) according to the AEA protocol based on the received disaster alert message. Then, the corrected AEAT and NRT component may be transmitted to the ATSC 3.0 core network 12 by using the UDP/IP protocol.

3. The AMF 23 may transmit the CBS message to the N3IWF 13 and a selected base station 25 of the RAN 24 at the same time.

4. The N3IWF 13 may extract a CBS ID from the CBS message as trigger information and transmit the extracted CBS ID to the ATSC 3.0 core network 12.

5. The selected base station 25 may broadcast a CBS paging signal to a mobile terminal MT of a corresponding cell. As soon as the paging signal is received, the mobile terminal MT is ready for receiving the CBS message 26 and the AEA message 16 (including the modified AEAT and NRT component) from the 5G base station 25 and the ATSC 3.0 broadcast station 15, respectively.

6. Trigger information received from the ATSC 3.0 core network 12 may be transmitted to the ATSC 3.0 broadcast station 15 by the modified AEAT and NRT component.

7. The 5G base station 25 and the ATSC 3.0 broadcast station 15 may broadcast the CBS message 26 and the AEA message 16 to the mobile terminal MT of the corresponding cell, respectively.

In steps 4 to 6, the trigger information is used for synchronization between the CBS paging signal and the AEA message, and the trigger information may cause the AEA message to be broadcasted after the CBS paging signal is asserted.

Figure 2:
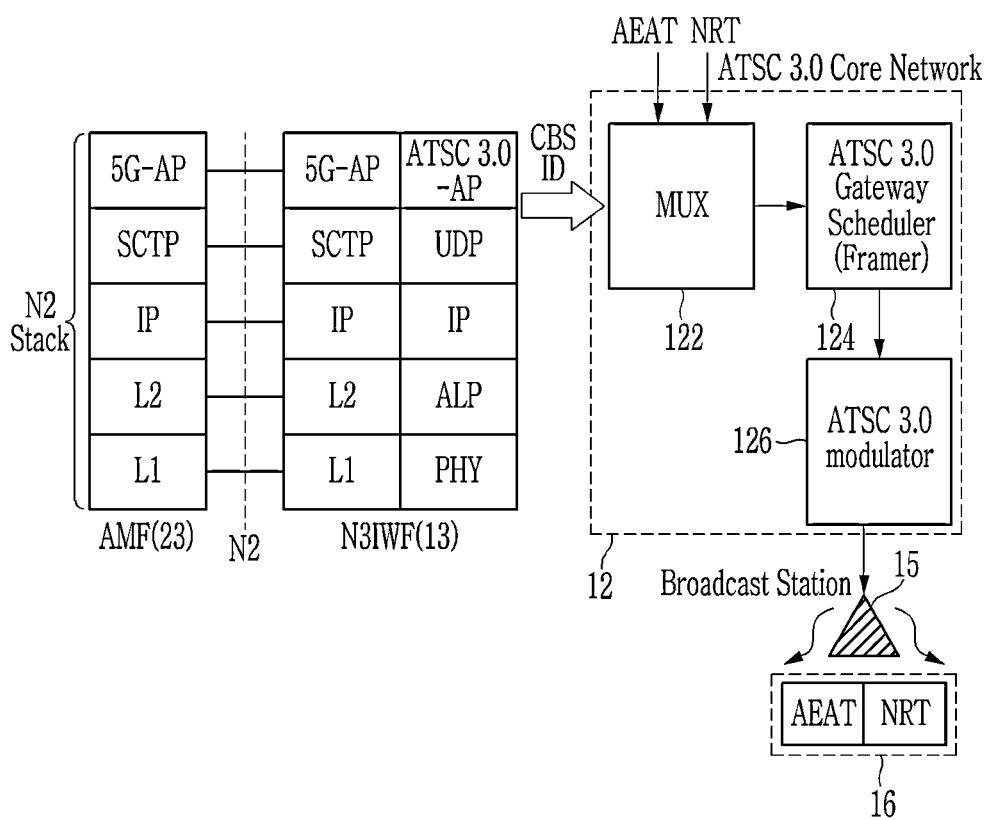
FIG. 2 is a diagram for describing an interface between an AMF and the ATSC 3.0 by using N3IWF in the disaster alert broadcasting system according to the example embodiment of the present disclosure.

FIG. 2 is a diagram for describing an interface between an AMF and the ATSC 3.0 by using the N3IWF in the disaster alert broadcasting system according to the example embodiment of the present disclosure.

FIG. 2 illustrates an example of a framework for an interface between the AMF 23 and the ATSC 3.0 core network 12 by using the N3IWF 13. The ATSC 3.0 core network 12 may include a multiplexer 122, an ATSC 3.0 gateway 124, and an ATSC 3.0 modulator 126. A procedure for simultaneously transmitting the 5G CBS message and the AEA message according to the example embodiment of the present disclosure is as follows.

1. The AMF 23 may transmit the CBS message to the N3IWF 13 and the selected base station 25. For the transmission of the CBS message, the AMF 23 may adopt an N2 protocol stack consisting of a 5G application protocol (5G-AP), an SCTP, an IP, a layer 2 L2, and a layer 1 L1. The 5G-AP may include the CBS message.

2. The N3IWF 13 may serve as a repeater between the AMF 23 and the ATSC 3.0 core network 12. For the connection to the AMF 23, the N3IWF 13 may adopt the N2 protocol stack. In order to connect to the ATSC 3.0 core network 12, the N3IWF 13 may depend on the ATSC 3.0 protocol stack, and the ATSC 3.0 protocol stack may consist of an ATSC 3.0 application protocol (ATSC3.0-AP), a UDP, an IP, an ATSC 3.0 link layer protocol (ALP), and an ATSC 3.0 PHY. The N3IWF 13 may extract a CBS ID from a CBS message, and transmit the CBS ID to the multiplexer 122 of the ATSC 3.0 core network 12. The ATSC3.0-AP may include the extracted CBS ID.

3. In the ATSC 3.0 core network 12, the multiplexer 122 may use the CBS ID as trigger information. When the received CBS ID matches the Header<CBS ID> of the modified AEAT, the multiplexer 122 may multiplex the AEAT and NRT components as the AEA message. When the received CBS ID does not match the Header<CBS ID> of the modified AEAT, the multiplexer 122 may temporarily stop the multiplexing operation until the received trigger information is matched. Accordingly, the CBS ID may be used as the trigger information for synchronizing the CBS paging signal and the AEA message.

4. In the ATSC 3.0 core network 12, the ATSC 3.0 gateway 12 may convert the AEA message into a frame unit of a physical layer, and the ATSC 3.0 gateway 12 may transmit the corresponding frame to the ATSC 3.0 modulator 126.

5. The ATSC 3.0 modulator 126 may convert the physical layer frame into a waveform signal for broadcasting.

6. The ATSC 3.0 broadcast station 15 may broadcast the waveform signal for the AEA message.

Figure 3:
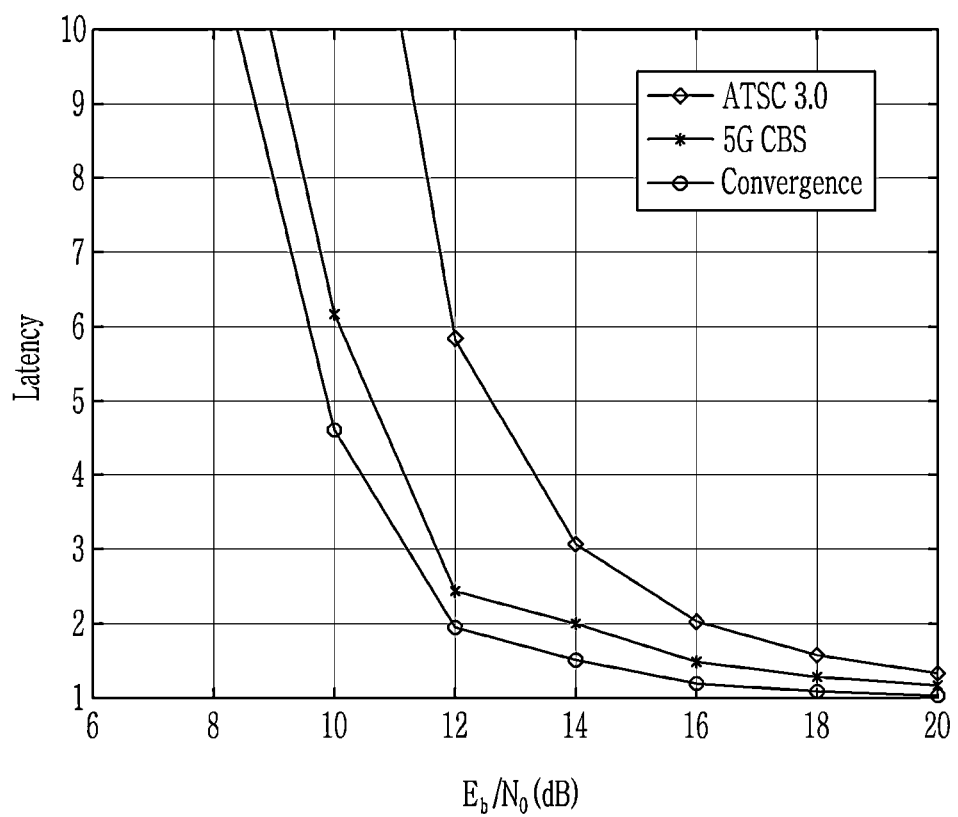
FIG. 3 is a diagram for describing performance of a disaster alert broadcasting method and system according to example embodiments of the present disclosure.

FIG. 3 is a diagram for describing performance of the disaster alert broadcasting method and system according to the example embodiments of the present disclosure.

FIG. 3 illustrates delay performance for the 5G and ATSC 3.0 disaster alert broadcast according to the example embodiment of the present disclosure. As illustrated in FIG. 3, it can be seen that the delay in the broadcast method according to the example embodiment of the present disclosure is considerably lower than the 5G CBS method or the AEA broadcasting method in the entire range of $E_b/N_0$. Therefore, it can be seen that the broadcast method according to the example embodiments of the present disclosure is more excellent than the 5G CBS method or the AEA broadcasting method, and this indicates that the convergence-based broadcasting approach method according to the example embodiments of the present disclosure is particularly more suitable for the transmission of an emergency disaster alert.

Figure 4:
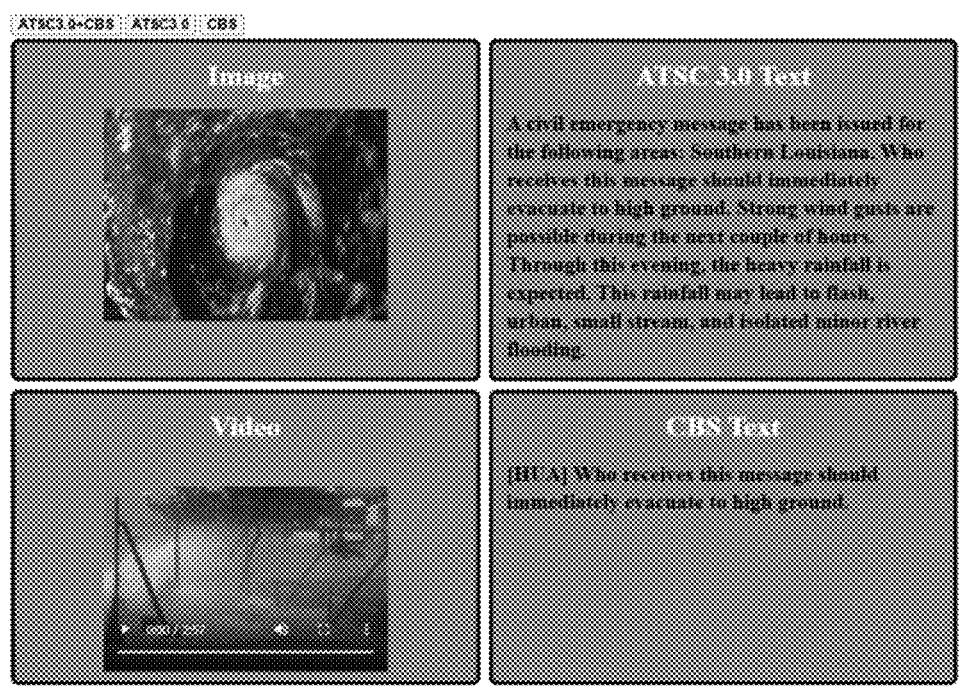
FIGS. 4 to 6 are diagrams for describing implementation examples of the disaster alert broadcasting method and system according to the example embodiments of the present disclosure.
Figure 5:
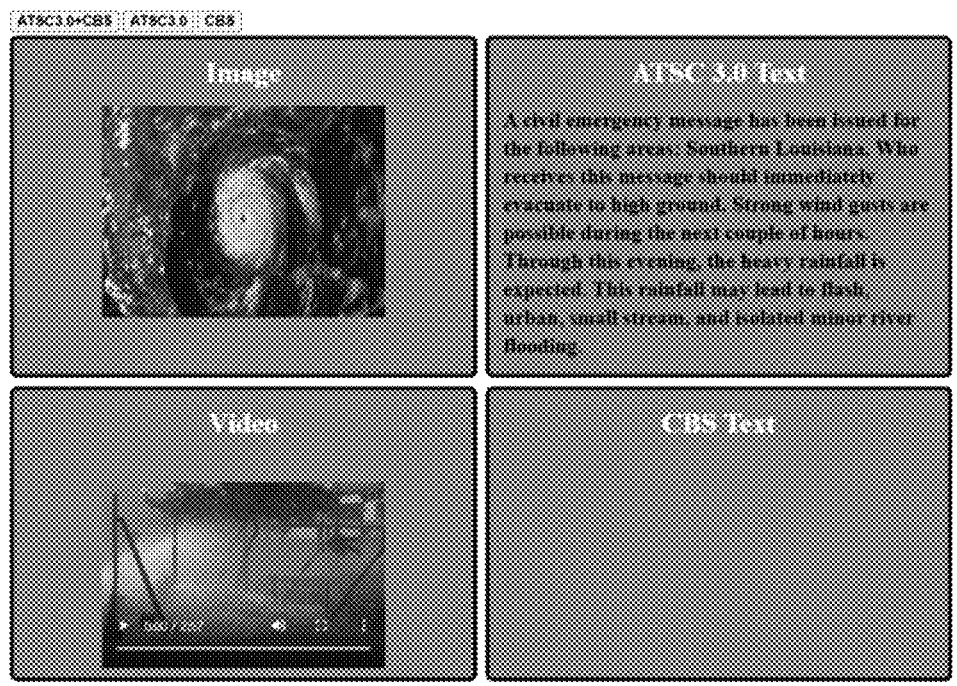
Figure 6:
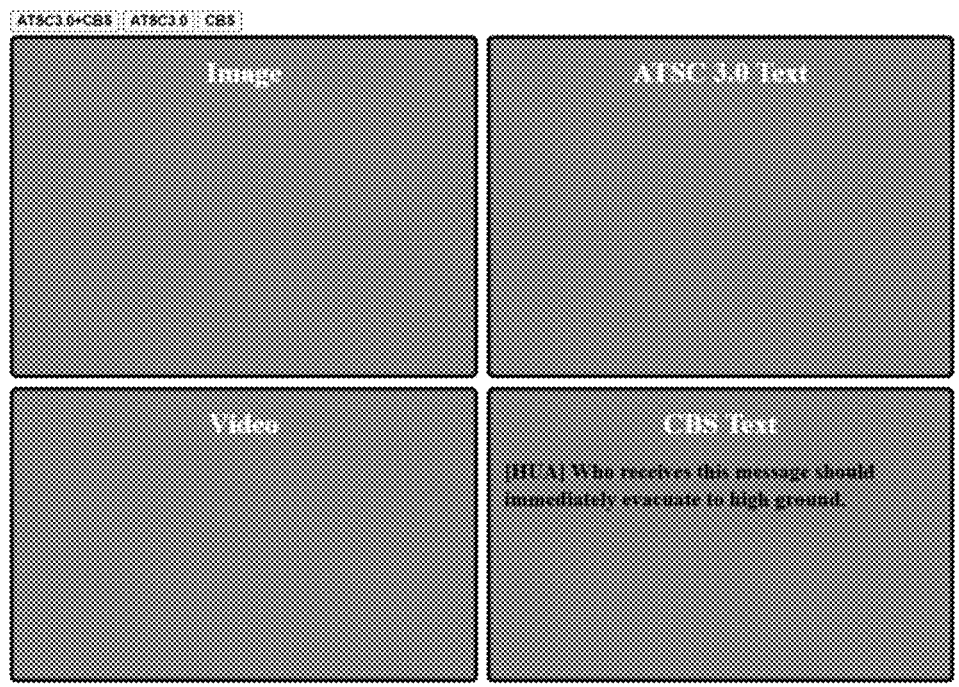

FIGS. 4 to 6 are diagrams for describing implementation examples of the disaster alert broadcasting method and system according to the example embodiments of the present disclosure.

Referring to FIGS. 4 to 6, in the disaster alert broadcasting method and system according to the example embodiments of the present disclosure, the screens of a mobile terminal MT in the case of successful decoding of the 5G CBS and AEA messages, successful decoding of the 5G CBS message and successful decoding of the AEA message are compared.

FIG. 4 illustrates a screen of the mobile terminal MT in the case of successful decoding of the 5G CBS and AEA messages. As illustrated in FIG. 4, the screen of the mobile terminal MT includes a long text, such as a guide line of the AEA message, an image, and multimedia contents, as well as a short text of the CBS message. Therefore, even an illiterate or a foreigner can easily recognize types of emergencies, such as earthquakes and hurricanes.

FIG. 5 illustrates the case in which the receiver fails to decode the CBS message. As illustrated in FIG. 5, a lower window of the CBS text is empty. However, the user may still obtain rich disaster information from the AEA message.

FIG. 6 illustrates the case in which the receiver fails to decode the AEA message. As illustrated in FIG. 6, a lower window of the AEA message text is empty. In this case, the user may obtain limited but useful disaster information from the CBS message.

Figure 7:
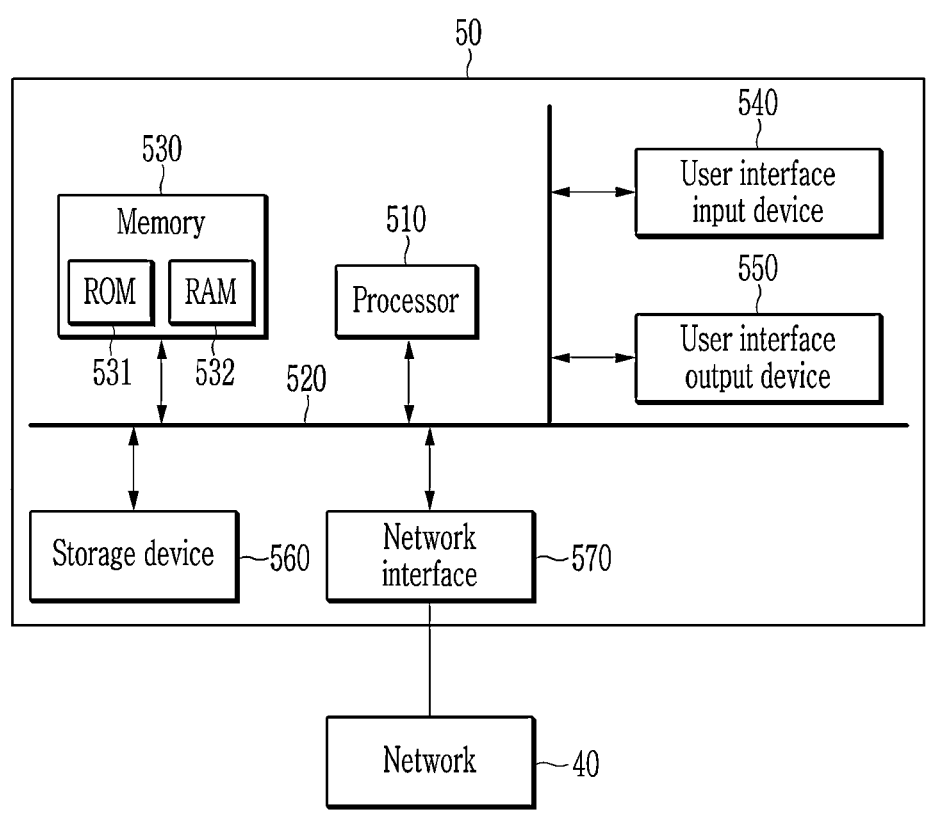
FIG. 7 is a block diagram for describing a computing device for implementing the disaster alert broadcasting method and system according to the example embodiments of the present disclosure.

FIG. 7 is a block diagram for describing a computing device for implementing the disaster alert broadcasting method and system according to the example embodiments of the present disclosure.

Referring to FIG. 7, a computing device 50 may include at least one of a processor 510, a memory 530, a user interface input device 540, a user interface output device 550, and a storage device 560 communicating through a bus 520. The computing device 50 may also include a network interface 570 electrically connected to a network 40, for example, a wireless network. The network interface 570 may transmit or receive another entity and a signal through the network 40.

The processor 510 may be an Application Processor (AP) and a central processing unit (CPU), or a predetermined semiconductor device executing instructions stored in the memory 530 or the storage device 560. The processor 510 may be configured to implement the function and the methods described above with reference to FIGS. 1 to 3.

The memory 530 and the storage device 560 may include various forms of volatile or non-volatile storage media. For example, the memory may include a Read Only Memory (ROM) 531 and a Random Access Memory (RAM) 532. In the example embodiment of the present disclosure, the memory 530 may be located inside or outside the processor 510, and the memory 530 may be connected with the processor 510 through already known various means.

Further, at least some of the functions of the disaster alert broadcasting method and system according to the example embodiment of the present disclosure may be implemented by a program or software executed in the computing device 50, and the program or software may be stored in a computer readable medium.

Further, at least some of the functions of the disaster alert broadcasting method and system according to the example embodiment of the present disclosure may also be implemented by hardware electrically connectable to the computing device 50.

According to the foregoing example embodiments of the present disclosure, the N3IWF is used for providing the convergence architecture of the 5G-based CBS and the ATSC 3.0 based network, so that it is possible to implement the interwork of the ATSC 3.0 network corresponding to the non-3GPP network and the 5G core network. Further, by providing the modified AEA table that allows the AEA message to be linked with the CBS message, it is possible to transmit the CBS message and the AEA message in the convergence network at the same time. Therefore, a user is capable of receiving the CBS message and the AEA message from the 5G network and the ATSC 3.0 network through his/her mobile terminal, thereby effectively reducing the transmission delay.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method of broadcasting a disaster alert, the method comprising:

receiving an Advanced Emergency Alert Table (AEAT) message and an Advance Emergency Alert (AEA) message generated to include an NRT component corresponding to a multimedia file from an AEA message application according to an AEA protocol;

receiving trigger information extracted from a Cell Broadcast Service (CBS) message from a Non-3GPP Inter-Working Function (N3IWF); and transmitting the AEA message to a mobile terminal through an Advanced Television Systems Committee (ATSC) 3.0 broadcast station according to the trigger information, wherein:

the AEA message further includes a CBS-related header, and the method further includes: determining whether the trigger information received from the N3IWF matches the CBS-related header by using a multiplexer;

when it is determined that the trigger information received from the N3IWF matches the CBS-related header, multiplexing the AEAT message and the NRT component to the AEA message; and when it is determined that the trigger information received from the N3IWF does not match the CBS-related header, temporarily stopping until the trigger information received from the N3IWF matches the CBS-related header.

2. The method of claim 1, wherein:
the AEA message and the CBS message are generated based on the same disaster alert issued from an alerting authority, and
the AEA message is transmitted to the mobile terminal by the AEA protocol, and
the CBS message is transmitted to the mobile terminal by a CBS protocol.

3. The method of claim 1, wherein:
the CBS-related header includes a first element indicating whether the AEAT message is associated with the CBS message, and a second element indicating an identifier of the associated CBS message.

4. The method of claim 1, further comprising:
converting the AEA message into a frame unit for a physical layer and transmitting the converted frame to a modulator by using a gateway.

5. The method of claim 3, further comprising:
converting the frame into a waveform signal by using the modulator,
wherein the transmitting of the AEA message to the mobile terminal includes
transmitting the AEA message to the mobile terminal as the waveform signal through the ATSC 3.0 broadcast station.

6. A system for broadcasting a disaster alert, the system comprising:
an Advance Emergency Alert (AEA) message application configured to generate an Advanced Emergency Alert Table (AEAT) message and an AEA message generated to include an NRT component corresponding to a multimedia file according to an AEA protocol;
a Non-3GPP InterWorking Function (N3IWF) configured to extract trigger information from a Cell Broadcast Service (CBS) message received from an Access and Mobility Management Function (AMF); and
an Advanced Television Systems Committee (ATSC) 3.0 core network configured to receive the AEA message from the AEA message application and transmit the AEA message to a mobile terminal through an ATSC 3.0 broadcast station according to the trigger information,
wherein:
the AEA message further includes a CBS-related header,
the ATSC 3.0 core network
determines whether the trigger information received from the N3IWF matches the CBS-related header by using a multiplexer; and
when it is determined that the trigger information received from the N3IWF matches the CBS-related header, the ATSC 3.0 core network multiplexes the AEAT message and the NRT component to the AEA message; and
when it is determined that the trigger information received from the N3IWF does not match the CBS-related header, the ATSC 3.0 core network temporarily stops until the trigger information received from the N3IWF matches the CBS-related header.

7. The system of claim 6, wherein:
the AEA message and the CBS message are generated based on the same disaster alert issued from an alerting authority, and
the AEA message is transmitted to the mobile terminal by the AEA protocol, and
the CBS message is transmitted to the mobile terminal by a CBS protocol.

8. The system of claim 6, wherein:
the CBS-related header includes a first element indicating whether the AEAT message is associated with the CBS message, and a second element indicating an identifier of the associated CBS message.

9. The system of claim 6, wherein:
the ATSC 3.0 core network converts the AEA message into a frame unit for a physical layer and transmits the converted frame to a modulator by using a gateway.

10. The system of claim 9, wherein:
the ATSC 3.0 core network
converts the frame into a waveform signal by using the modulator, and
transmits the AEA message to the mobile terminal as the waveform signal through the ATSC 3.0 broadcast station.

* * * * *